US011249789B2

(12) United States Patent
Zhou et al.

(10) Patent No.: US 11,249,789 B2
(45) Date of Patent: Feb. 15, 2022

(54) NETWORK PERFORMANCE OPTIMIZATION IN A HYPERVISOR-BASED SYSTEM

(71) Applicant: International Business Machines Corporation, Armonk, NY (US)

(72) Inventors: Mo Zhou, WuXi (CN); He Jing, WuXi (CN); XingYu Zhu, WuXi (CN); Yi Jing Zhu, WuXi (CN)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/734,834

(22) Filed: Jan. 6, 2020

(65) Prior Publication Data

US 2021/0208917 A1 Jul. 8, 2021

(51) Int. Cl.
*G06F 9/455* (2018.01)

(52) U.S. Cl.
CPC ........ *G06F 9/45558* (2013.01); *G06F 9/4555* (2013.01); *G06F 2009/45587* (2013.01); *G06F 2009/45595* (2013.01)

(58) Field of Classification Search
CPC ............... G06F 9/45558; G06F 9/4555; G06F 2009/45587; G06F 2009/45595
See application file for complete search history.

(56) References Cited

U.S. PATENT DOCUMENTS

| 9,213,567 | B2 | 12/2015 | Barde | |
|---|---|---|---|---|
| 2012/0033673 | A1* | 2/2012 | Goel | G06F 9/45558 370/400 |
| 2012/0084487 | A1* | 4/2012 | Barde | G06F 9/45541 711/6 |
| 2012/0284712 | A1* | 11/2012 | Nimmagadda | G06F 9/5077 718/1 |

(Continued)

FOREIGN PATENT DOCUMENTS

| CN | 103118066 A | 5/2013 |
|---|---|---|
| CN | 103176833 B | 6/2013 |
| WO | 2018184701 A1 | 10/2018 |

OTHER PUBLICATIONS

Reece Johnston; Xen Network Flow Analysis for Intrusion Detection; ACM 2016 (Year: 2016).*

(Continued)

*Primary Examiner* — Dong U Kim
(74) *Attorney, Agent, or Firm* — Mark Bergner

(57) ABSTRACT

A computer-implemented hypervisor system and method comprises utilizing the hypervisor system, which comprises a privileged domain (PD) and a guest domain (GD). The PD is an instance of a virtual machine that has direct access to hardware devices. The PD comprises a back-end interface for communicating with other GDs. The GD is an instance of a virtual machine that does not have direct access to hardware devices, and comprises a front-end interface for communicating with the PD and communicates only packets with the PD. On the GD, and in an initialization stage of the (Continued)

front-end interface, the system allocates a predefined number of packet data entries for storing packet data, allocates the predefined number of grant table entries, each comprising a grant table id. During the initialization stage, each grant table entry is bound with a packet data entry.

18 Claims, 5 Drawing Sheets

(56) References Cited

U.S. PATENT DOCUMENTS

2012/0296585 A1* 11/2012 Chen ................. G16Z 99/00
                                                               702/61
2013/0036470 A1*  2/2013 Zhu ................... H04L 63/0227
                                                               726/23

OTHER PUBLICATIONS

K A Fraser; https://code.woboq.org/linux/linux/include/xen/interface/grant_table.h.html; 2004 (Year: 2004).*
Achieving 10 Gb/s using Safe and Transparent Network Interface Virtualization; Kaushik Kumar Ram; Mar. 2009; ACM (Year: 2009).*
Menon et al., "Optimization Network Virtualization in Xen," Usenix 06, Apr. 17, 2006, 23 pages. static.usenix.org/events/usenix06/tech/menon/menon_html/paper.html.
"Xen Guide", Release 2.0.0, Apr. 24, 2015, 11 pages.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

NETWORK PERFORMANCE OPTIMIZATION IN A HYPERVISOR-BASED SYSTEM

BACKGROUND

Disclosed herein is a system and related method for improving network performance in a hypervisor-based system, particularly a Xen® platform. Bottlenecks for communication between virtual machines and hardware devices may sometimes pose a problem for network performance.

SUMMARY

According to one aspect disclosed herein, a computer-implemented method is provided comprising, utilizing a hypervisor system comprising a privileged domain (PD) and a guest domain (GD), where the PD is an instance of a virtual machine that has direct access to hardware devices. The PD comprises a back-end interface for communicating with other GDs. The GD is an instance of a virtual machine that does not have direct access to hardware devices, and comprises a front-end interface for communicating with the PD and communicates only packets with the PD. The method further comprises, on the GD in an initialization stage of the front-end interface, allocating a predefined number of packet data entries for storing packet data, allocating the predefined number of grant table entries, each comprising a grant table id. The method further comprises, during the initialization stage, binding each grant table entry with a packet data entry.

According to another aspect disclosed herein, a hypervisor system is provided comprising a privileged domain (PD) that is an instance of a virtual machine that has direct access to hardware devices. The PD comprises a back-end interface for communicating with other GDs. The hypervisor system further comprises and a guest domain (GD) that is an instance of a virtual machine that does not have direct access to hardware devices. The GD comprises a front-end interface for communicating with the PD and communicates only packets with the PD. A processor of the GD is configured to, in an initialization stage of the front-end interface, allocate a predefined number of packet data entries for storing packet data, allocate the predefined number of grant table entries, each comprising a grant table id, and bind each grant table entry with a packet data entry.

A computer program product is disclosed herein that may contain instructions that, when executed on a processor, perform any of the operations described herein.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
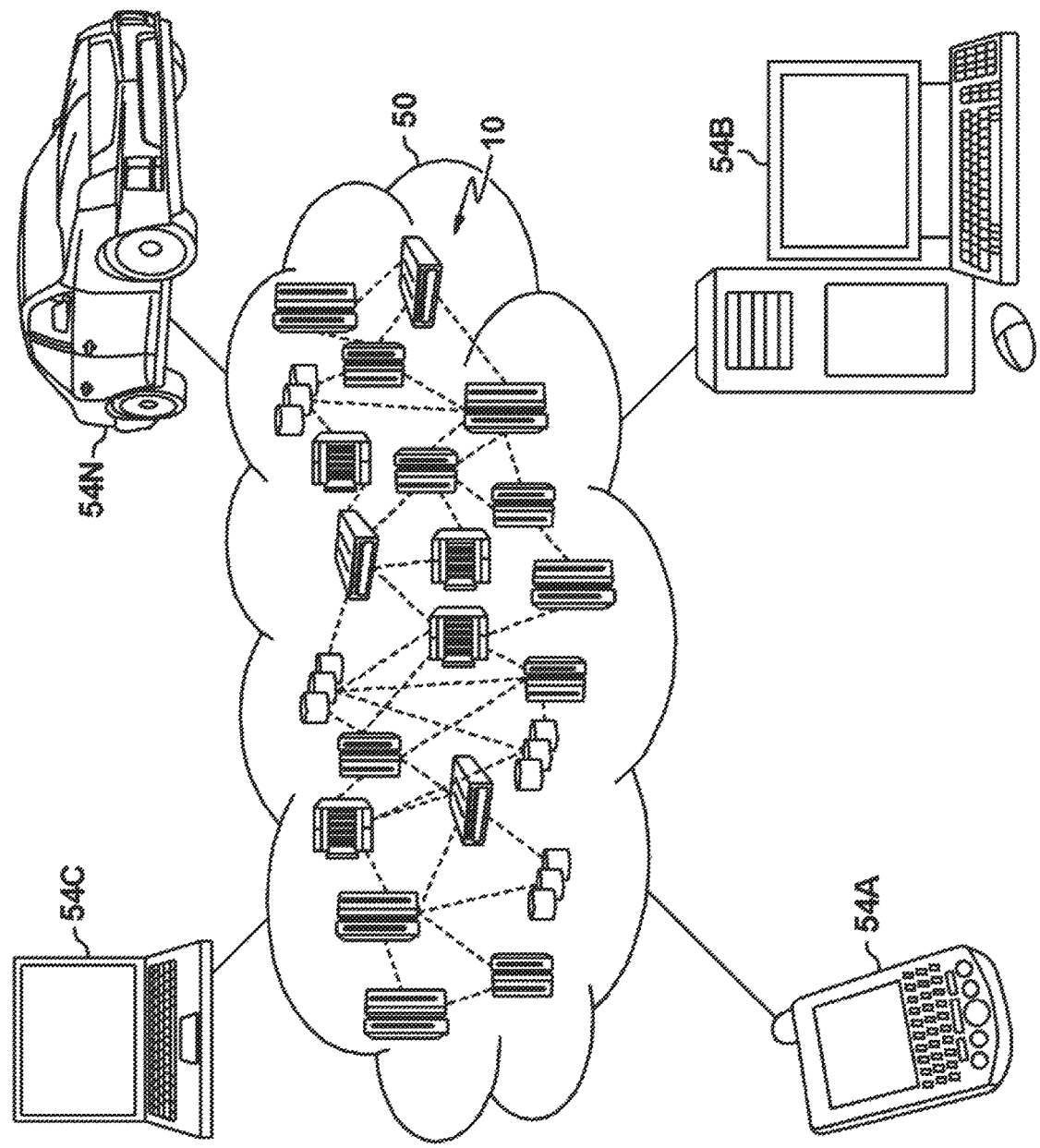
FIG. 1 depicts a cloud computing environment according to an embodiment of the present invention.

In order to improve network performance in a hypervisor-based system, data buffers and management entries for communication are pre-allocated during an initialization stage of a new domain, relieving the system of the requirement to do this at the point in time of data communications between domains.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
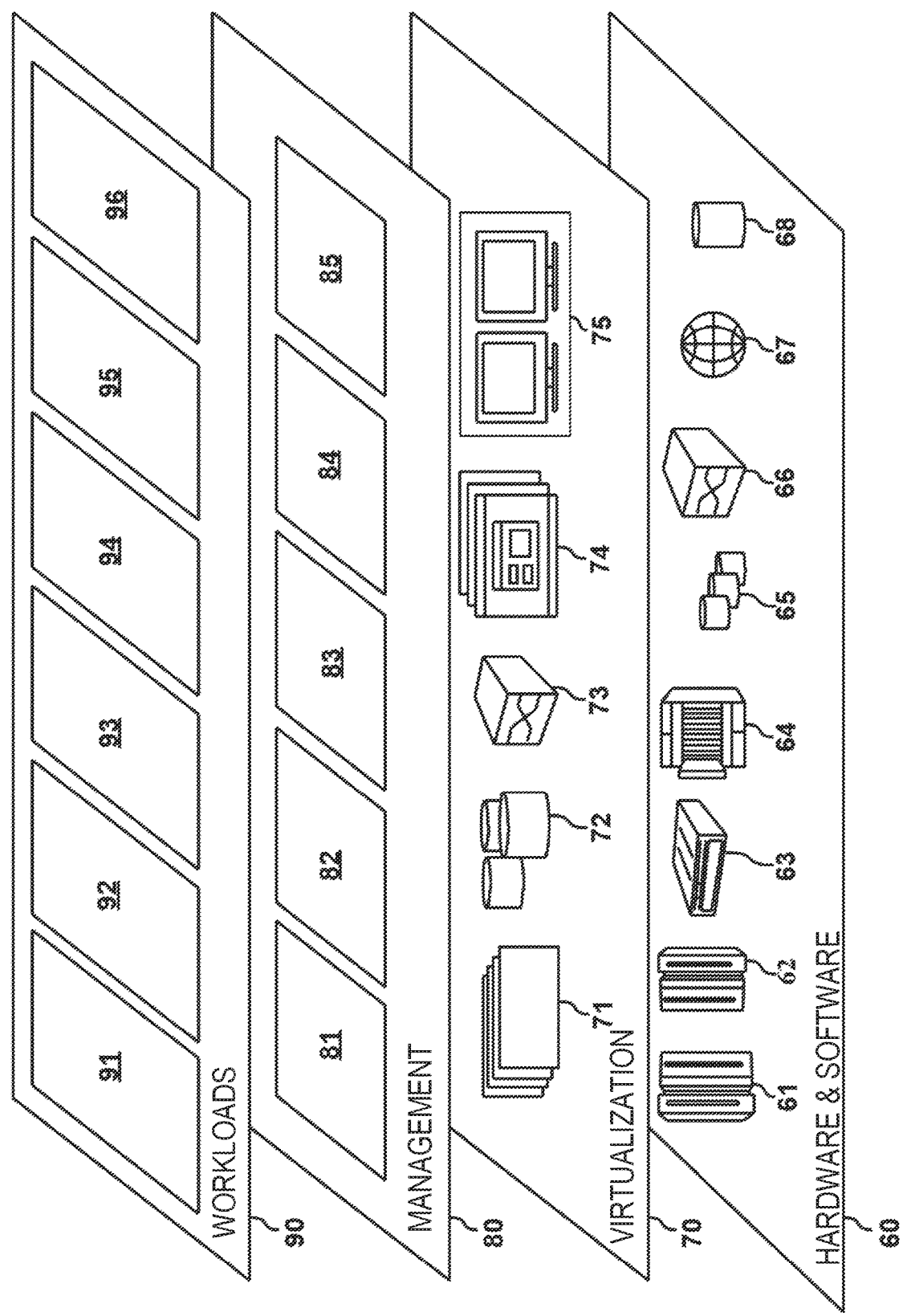
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
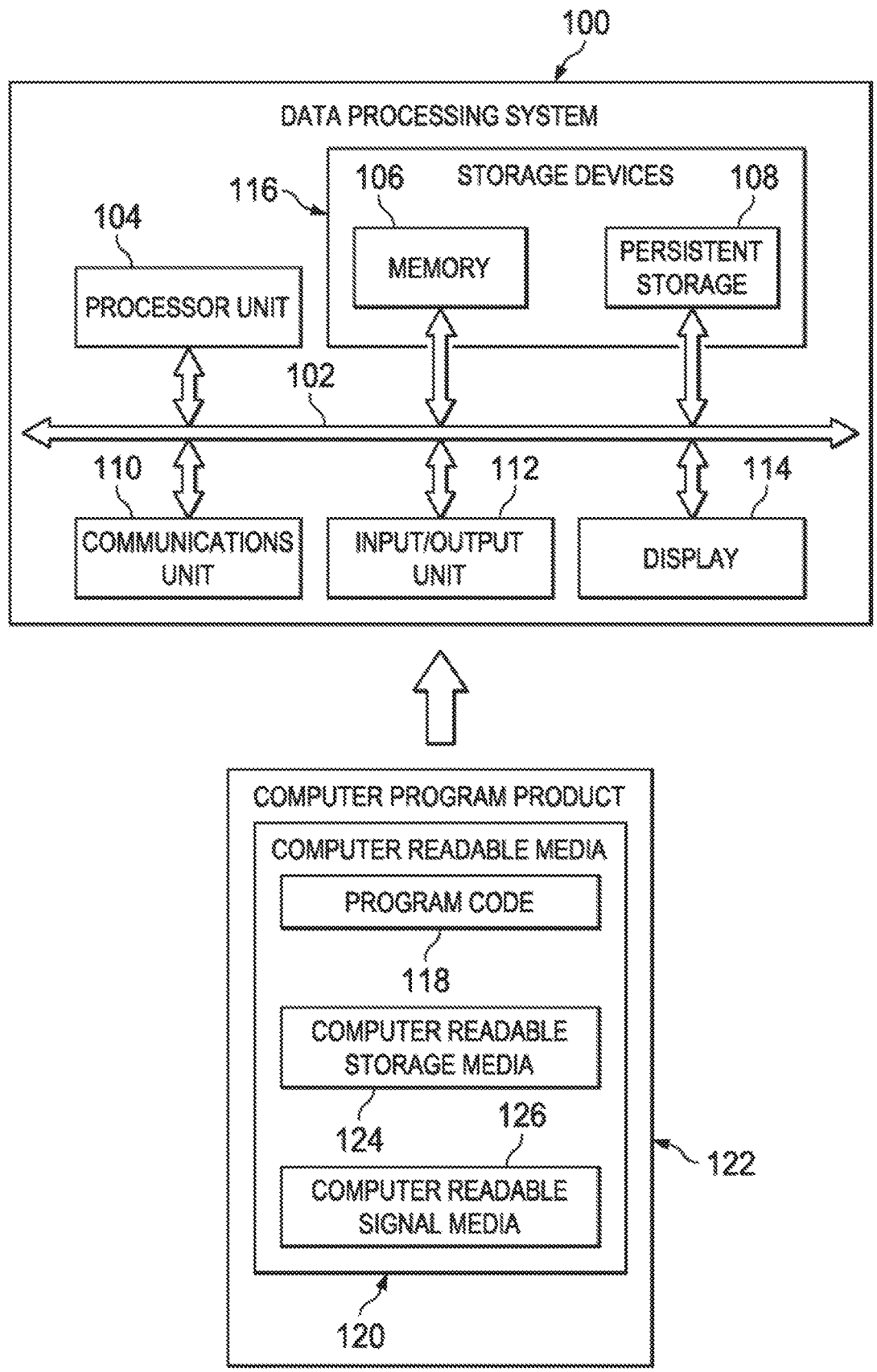
FIG. 3 is a block diagram of a data processing system (DPS) according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random-access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
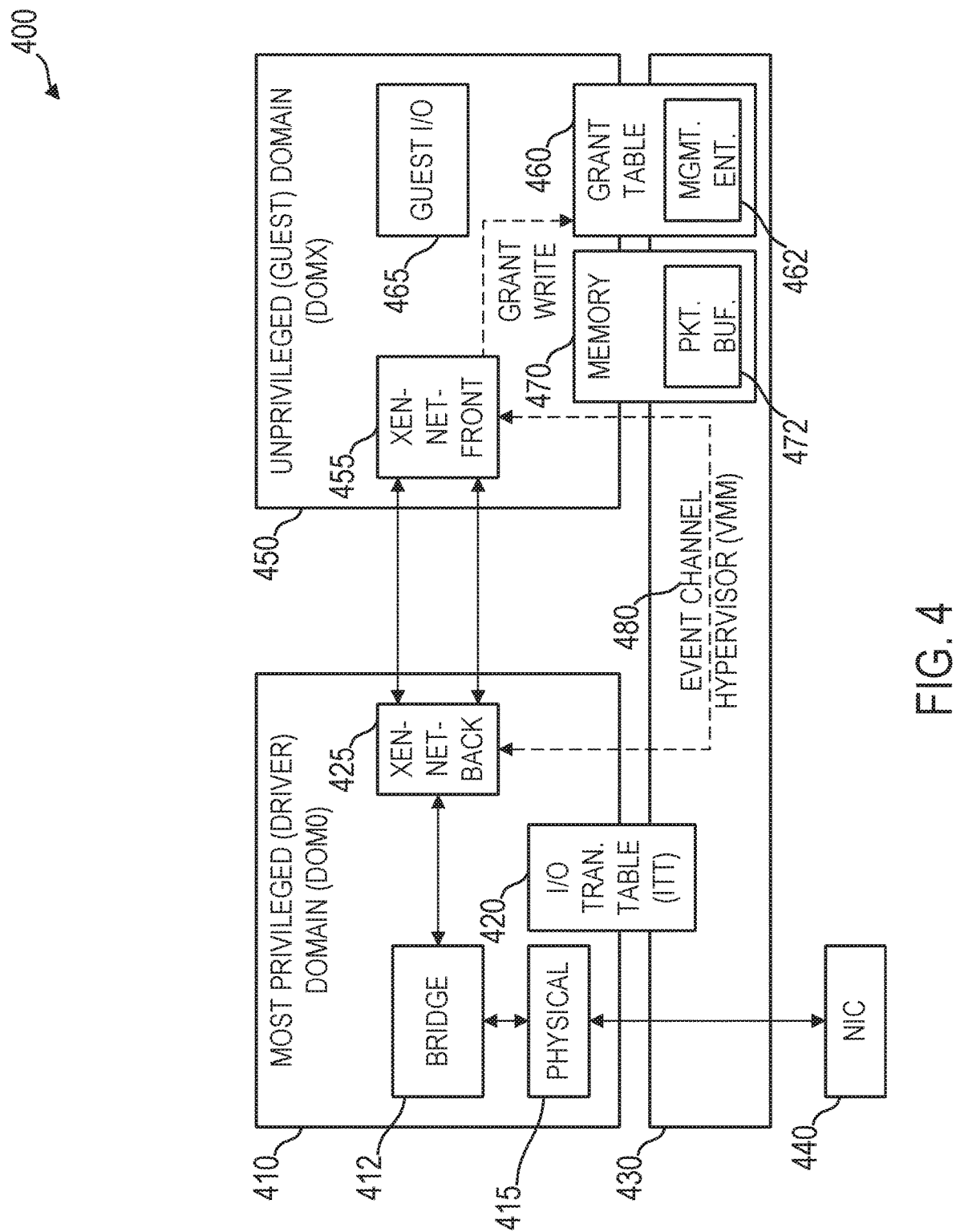
FIG. 4 is a block diagram of one or more embodiments of a hypervisor system, according to some implementations.

FIG. 4 is a block diagram illustrating a Xen® Project-based system 400, which is a type of a hypervisor system.

The Xen® Project is a type-1 hypervisor using a microkernel design, providing services that allow multiple computer operating systems to execute on the same computer hardware concurrently. Xen® runs in a more privileged CPU state than any other software on the machine. An example of a machine on which the hypervisor may run is the DPS 100, and such a machine may, for example, run in a cloud computing environment 50 on the one or more cloud computing nodes 10.

A Xen® domain is a specific instance of a Xen® virtual machine running on a specific physical piece of hardware. Responsibilities of the hypervisor include memory management and CPU scheduling of all virtual machines ("domains"), and for launching the most privileged domain ("Domain 0", or "Dom0" for short) 410, which is the only virtual machine which by default has direct access to hardware, such as the network interface card 440. From Dom0 410, the hypervisor can be managed, and unprivileged domains ("DomU", or "DomX") 450, such as user/guest domains, can be launched.

Dom0 410 is typically a version of Linux® or BSD®. DomUs 450 may either be traditional operating systems, such as Microsoft Windows®, under which privileged instructions are provided by hardware virtualization instructions (if the host processor supports x86 virtualization, e.g., Intel VT-x® and AMD-V®), or paravirtualized (PV) operating systems in which the operating system is aware that it is running inside a virtual machine, and so makes hypercalls directly, rather than issuing privileged instructions.

Paravirtualization (PV) is an efficient and lightweight virtualization technique that does not require virtualization extensions from the host CPU and thus enables virtualization on hardware architectures that do not support hardware-assisted virtualization. However, PV guests and control domains require kernel support and drivers that in the past required special kernel builds, but are now part of the Linux kernel as well as other operating systems. PV implements the following functionality: disk and network drivers, interrupts and timers, emulated motherboard and legacy boot, privileged instructions, and page tables.

Disk and network support is implemented via a pair of very simple PV back-end and PV front-end drivers. Architecturally, PV works by opening additional channels of communication between the hypervisors and the guest operating systems via PV front end and back end drivers. PV delivers higher performance than full virtualization because the operating system and hypervisor work together more efficiently, without the overhead imposed by the emulation of the system's resources. This makes a big difference for disk and network operations, where the use of PV network, bus, and block device drivers enable near-native performance.

The guest DomX 450 may only communicate packets with Dom0 410, and Dom0 410 then forwards packets between the other DomXs 450. The Xen® platform uses a virtual network interface called Xen-netback 425 (generically, a back-end interface) in Dom0 410 to communicate with a guest DomX 450 through the Xen-netfront 455 interface (generically, a front-end interface), which is a counterpart for the Xen-netback 425. Xen-netfront 455 and Xen-netback 425 use shared transmit and receive (tx/rx) rings of asynchronous requests/responses to exchange data (including grant-table management entry 462 ids). The grant-table entries are used to exchange the actual packet data. The shared tx/rx rings' memory is allocated from the DomX memory 470 and shared with the Dom0 xen-netback 425. The packet buffers 472 are also allocated from the DomX memory 470, but do not directly correspond with shared rings' memory.

Xen's grant tables 460 provide a generic mechanism to memory sharing between domains. This shared memory interface underpins the split device drivers for block and network I/O. Each domain 410, 450 has its own grant table 460. The grant table 460 is a data structure that is shared with Xen®; it allows the domain to tell Xen® what kind of permissions other domains have on its pages. Entries in the grant table 460 (also referred to herein as a management entry 462) are identified by grant references (alternately, grant ids). A grant reference is an integer, which indexes into the grant table 460. It acts as a capability which the grantee can use to perform operations on the granter's memory. This capability-based system allows shared-memory communications between unprivileged domains. A grant reference also encapsulates the details of a shared page, removing the need for a domain to know the real machine address of a page it is sharing. This makes it possible to share memory correctly with domains running in fully virtualized memory.

Traditionally, every time the DomX 450 transmits or receives a packet, it must utilize a large number of memory allocations and settings, including obtaining access privileges and data addresses frequently. This causes a lower guest network I/O performance and makes I/O a bottleneck in the virtualized environment.

Various embodiments of a system and related method are disclosed that, in the Xen® platform, helps to minimize/avoid memory allocations and settings in the guest domain before packet transmission to promote the performance of the network I/O in the virtualized environment. To do this, the system (the unprivileged DomX 450) pre-allocates memory 470 and management entries 462, each having their grant table entry id, in the grant table 460. Each management entry 462 is bound to a pre-allocated packet buffer 472 and sets an access privilege and packet data address in advance of a packet transmission or reception. These tasks of setting up the management entries 462 and pre-allocating packet buffers 472 are completed during initialization of the Xen-netfront 455, which occurs during initialization of the DomX 450. Thus, according to various embodiments, access privilege and data address setting of the grant-table management entry 462 in the Xen-netfront 455 during packet transmission may be avoided, promoting the performance of the network I/O speed in the virtualized environment. A grant table entry ("grant_entry_v1") 462 comprises three parts: permission information ("flags"), which the domain can access ("domain_id") and the packet data address ("frame") in Linux code. This enables use of a grant entry id to find the grant entry and the relative packet data address as an offset from the start of the packet buffer 472.

After initialization is complete, and during normal operation, when a packet buffer 472 is assigned to a transmit or receive packet, the corresponding management entry 462 that has previously been bound with the packet buffer 472 is fetched and is used to communicate with the Xen-netback 425 in Dom0 410. Advantageously, this approach is transparent to the Xen-netback 425 in Dom0 410, and thus requires no changes in current deployments (i.e., is compatible with existing Dom0 410 implementations).

Xen-netfront 455 and Xen-netback 425 use event channels 480 to notify each other. Event channels 480 are the basic primitive provided by Xen® for event notifications. An event is the Xen® equivalent of a hardware interrupt. They essentially store one bit of information, and the event of interest is signaled by transitioning this bit from 0 to 1.

Notifications are received by a guest via an upcall from Xen®, indicating when an event arrives (setting the bit). Further notifications are masked until the bit is cleared again (therefore, guests must check the value of the bit after re-enabling event delivery to ensure no missed notifications) . Event notifications can be masked by setting a flag; this is equivalent to disabling interrupts and can be used to ensure atomicity of certain operations in the guest kernel. Events are stored in a bitmap shared between guest and hypervisor.

Figure 5:
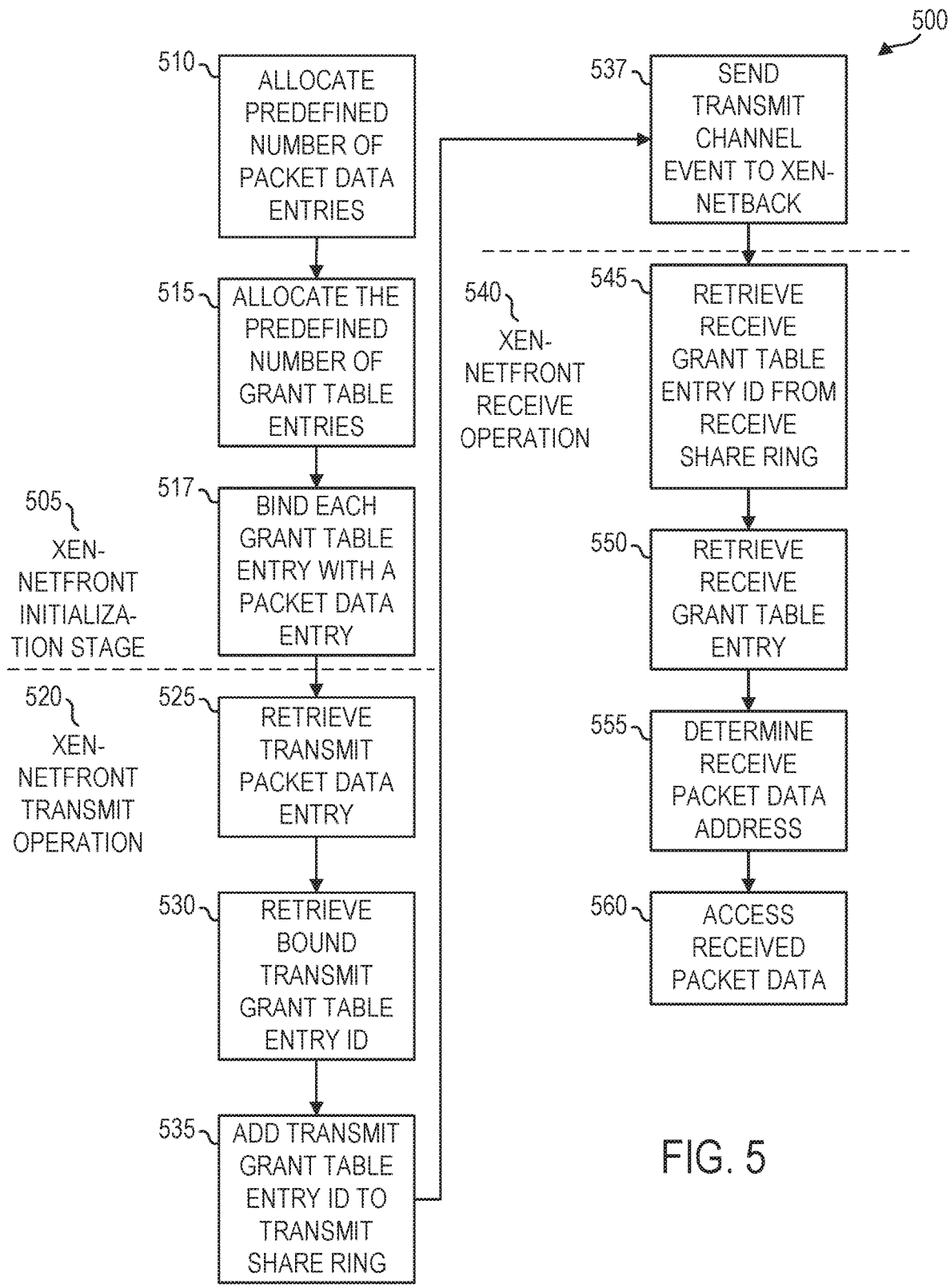
FIG. 5 is a flowchart of one or more embodiments of a process disclosed herein.

FIG. 5 is a flowchart of an example process 500, according to some embodiments. When a new guest domain DomX 450 is instantiated, part of the procedure is to initialize the Xen-netfront 455 interface so that the DomX 450 can communicate with other domains, particularly the Dom0 410 so that it may access needed hardware, such as the NIC 440. During a Xen-netfront initialization stage 505, in operation 510, a predefined number of packet data entries (packet buffers 472) are allocated to hold future packet data in the memory 470. These packet buffers 472 may be in a data structure format such as skb (e.g., Linux®) or mbuf (e.g., BSD®). This may be in the form of initializing the shared tx/rx rings and other data structures. This initialization of the shared tx/rx rings may include setting the rx ring to prepare for rx packets from the Xen-netback 425. The packet data entries may store the id of the grant table management entry 462 in its structure, and the grant table management entry 462 may record the packet data buffer address of the packet data entry 472 and set its access privilege. The predefined number of packet data entries may be determined empirically. In one test case, approximately two thousand packet buffers were pre-allocated for a 10G port tx/rx performance test with each packet buffer being 2 KB. Adequate performance was determined using a total of 4 MB of memory (two thousand packet buffers*2 KB each). Performance logs may be kept and reviewed, either manually or automatically, to optimize the number of buffers pre-allocated. For example, if only half of the buffers are consistently used, then the number of pre-allocated buffers may be reduced at each initialization. If the pre-allocated buffers consistently run out, then this number of pre-allocated buffers may be increased at each initialization.

In operation 515, an equal predefined number of grant table management entries 462 are allocated in the grant table 460, which may be in the form of socket buffers (skbs). The rx buffer addresses of the skbs may be set into grant table management entries 462 in operation 517, in which each of the grant table management entries 462 are bound to each packet data entry 472. Access privileges may be set for these grant table management entries 462, and the grant table management entries 462 may be put into the rx ring, after which a channel event may be sent over the event channel 480 to notify the Xen-netback 425 of the completion of initialization. Based on the above operations, allocations that will be subsequently used by the Xen-netfront 455 are allocated prior to normal operation. The Xen-netfront 455 may connect with the Xen-netback 425 during the initialization.

During a later Xen-netfront transmit operation 520, in operation 525, the packet data entry (packet buffer 472) that will be used to transmit the packet data is retrieved. In operation 530, the grant table entry id in the management entry 462 that was bound, during the initialization stage 505, to the packet buffer 472 is retrieved and is added to the transmit share ring. In operation 537, a transmit channel event is sent to the Xen-netback 425 of the Dom0 410 via the event channel 480 of the hypervisor 430. This notifies the Dom0 410 of the data packet being transmitted by the DomX 450.

This transmit operation 520 differs from prior implementations in which the Xen-netfront 455 would: a) get the address of the tx packet buffer 472; b) allocate an entry from the Xen-netfront grant-table management entry 462; c) set access privilege of the entry 462 (e.g., allow the Xen-netback 425 to read); d) set the address of tx packet into the entry 462; and e) send a tx channel event over the event channel 480 to notify the Xen-netback 425 of the transmission. The present implementations may improve over this prior implementation in that it may speed up the VM network I/O performance.

During a later Xen-netfront receive operation 540, in operation 545, the Xen-netfront 455 retrieves a receive grant table management entry id from the rx share ring. In operation 550, it retrieves the receive grant table management entry 462, and then, in operation 555, it determines the receive packet data address in order to, in operation 560, accesses the received packet data. The packet data may then be handled by upper layer protocols.

This receive operation 540 differs from prior implementation in which the Xen-netfront 455 would: a) receive an rx channel event over the event channel 480 from the Xen-netback 425; b) get the grant-table entry management entry 462 id from the rx ring; c) unset the access privilege of the grant-table management entry 462; d) get the skb (the packet buffer 472 where the packet data is in) and let the upper protocol(s) process the packet data; e) release the grant-table management entry 462; and f) set the rx ring to prepare for rx new packets.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    utilizing a hypervisor system comprising a privileged domain (PD) and a guest domain (GD), wherein:
        the PD is an instance of a virtual machine that:
            has direct access to hardware devices; and
            comprises a back-end interface for communicating with GDs; and
        the GD is an instance of a virtual machine that:
            does not have direct access to hardware devices;
            comprises a front-end interface for communicating with the PD and communicates only packets with the PD;
    the method further comprising, on the GD:
        in an initialization stage of the front-end interface:
            allocating an empirically-determined and automatically optimized predefined number of packet data entries for storing packet data based on prior performance data from performance logs;
            allocating a number of grant table entries equal to the predefined number, each comprising a grant table id, permission information, and domain access information; and
            binding each grant table entry with a packet data entry.

2. The method of claim 1, further comprising, on the GD:
    in a transmit operation from the front-end interface to the back-end interface:
        retrieving a transmit packet data entry holding transmit packet data;

retrieving a transmit grant table entry id that is bound with the transmit packet data entry;

adding the transmit grant table entry id to a transmit share ring; and sending a transmit channel event to the back-end interface to notify the back-end interface of the addition of the transmit grant table entry id to the transmit share ring.

3. The method of claim 1, further comprising, on the GD: in a receive operation of the front-end interface:

retrieving a receive grant table entry id from a receive share ring;

retrieving a receive grant table entry utilizing the receive grant table entry id;

determining a receive packet data address from the receive grant table entry; and accessing received packet data from the received packet data address.

4. The method of claim 3, wherein the determining of the receive packet data address is performed utilizing an offset from the packet buffer.

5. The method of claim 1, wherein the hypervisor system is a paravirtualized system that implements disk and network drivers, interrupts and timers, emulated motherboard and legacy boot, privileged instructions, and page tables.

6. The method of claim 1, wherein packet data entries are stored in at least one of a transmit ring and a receive ring.

7. The method of claim 1, wherein the GD communicates packet data to other domains only via the PD.

8. The method of claim 1, wherein the grant table entries are in a form of socket buffers.

9. The method of claim 1, wherein the predefined number of data packet entries is determined as proportional to two thousand data packet entries per ten gigabits of port transmit/receive speed.

10. A hypervisor system, comprising:

a privileged domain (PD) that is an instance of a virtual machine that:

has direct access to hardware devices; and comprises a back-end interface for communicating with other GDs; and a guest domain (GD) that is an instance of a virtual machine that:

does not have direct access to hardware devices;

comprises a front-end interface for communicating with the PD and communicates only packets with the PD; and a processor of the GD that is configured to:

in an initialization stage of the front-end interface:

allocate an empirically-determined and automatically optimized predefined number of packet data entries for storing packet data based on prior performance data from performance logs;

allocate a number of grant table entries equal to the predefined number, each comprising a grant table id, permission information, and domain access information; and bind each grant table entry with a packet data entry.

11. The system of claim 10, wherein the processor is further configured to:

in a transmit operation from the front-end interface to the back-end interface:

retrieve a transmit packet data entry holding transmit packet data;

retrieve a transmit grant table entry id that is bound with the transmit packet data entry;

add the transmit grant table entry id to a transmit share ring; and send a transmit channel event to the back-end interface to notify the back-end interface of the addition of the transmit grant table entry id to the transmit share ring.

12. The system of claim 10, wherein the processor is further configured to:

in a receive operation from the back-end interface to the front-end interface:

retrieve a receive grant table entry id from a receive share ring;

retrieve a receive grant table entry utilizing the receive grant table entry id;

determine a receive packet data address from the receive grant table entry; and access received packet data from the received packet data address.

13. The system of claim 10, wherein the hypervisor system is a paravirtualized system that implements disk and network drivers, interrupts and timers, emulated motherboard and legacy boot, privileged instructions, and page tables.

14. The system of claim 10, wherein packet data entries are stored in a transmit ring and a receive ring.

15. The hypervisor system of claim 10, wherein the grant table entries are in a form of socket buffers.

16. A computer program product for a hypervisor system, the computer program product comprising a computer readable storage medium having computer-readable program code embodied therewith to, when executed on a processor of a guest domain (GD):

provide a privileged domain (PD) that is an instance of a virtual machine that:

has direct access to hardware devices; and comprises a back-end interface for communicating with other GDs; and provide the GD that is an instance of a virtual machine that:

does not have direct access to hardware devices;

comprises a front-end interface for communicating with the PD and communicates only packets with the PD; and in an initialization stage of the front-end interface:

allocate an empirically-determined and automatically optimized predefined number of packet data entries for storing packet data based on prior performance data from performance logs;

allocate a number of grant table entries equal to the predefined number, each comprising a grant table id, permission information, and domain access information; and bind each grant table entry with a packet data entry.

17. The computer program product of claim 16, wherein the code further causes the processor to:

in a transmit operation from the front-end interface to the back-end interface:

retrieve a transmit packet data entry holding transmit packet data;

retrieve a transmit grant table entry id that is bound with the transmit packet data entry;

add the transmit grant table entry id to a transmit share ring; and send a transmit channel event to the back-end interface to notify the back-end interface of the addition of the transmit grant table entry id to the transmit share ring.

18. The computer program product of claim 16, wherein the code further causes the processor to:
- in a receive operation from the back-end interface to the front-end interface:
  - retrieve a receive grant table entry id from a receive share ring;
  - retrieve a receive grant table entry utilizing the receive grant table entry id;
  - determine a receive packet data address from the receive grant table entry; and
  - access received packet data from the received packet data address.

* * * * *